(12) United States Patent
Moosmann et al.

(10) Patent No.: US 7,640,619 B2
(45) Date of Patent: Jan. 5, 2010

(54) BEARING FOR WIPER DRIVES

(75) Inventors: Johannes Moosmann, Buehlertal (DE); Claus Fleischer, Buehl (DE); Norbert Wegner, Buehl (DE); Thomas Weigold, Baden-Baden (DE); Joachim Zimmer, Sasbach (DE)

(73) Assignee: Robert Bosch GmbH, Stuttgart (DE)

( * ) Notice: Subject to any disclaimer, the term of this patent is extended or adjusted under 35 U.S.C. 154(b) by 568 days.

(21) Appl. No.: 10/481,904

(22) PCT Filed: Mar. 13, 2003

(86) PCT No.: PCT/DE03/00798

§ 371 (c)(1),
(2), (4) Date: Dec. 23, 2003

(87) PCT Pub. No.: WO2004/026642

PCT Pub. Date: Apr. 1, 2004

(65) Prior Publication Data

US 2004/0216258 A1 Nov. 4, 2004

(30) Foreign Application Priority Data

Sep. 12, 2002 (DE) .............................. 102 42 298

(51) Int. Cl.
*B60S 1/06* (2006.01)
*B60S 1/08* (2006.01)

(52) U.S. Cl. .................. 15/250.31; 15/250.3; 248/638; 296/96.17; 411/512; 411/907; 411/908

(58) Field of Classification Search ................ 15/250.3, 15/250.31; 296/96.15, 96.17; 411/226, 512, 411/907, 908; 248/638, 635
See application file for complete search history.

(56) References Cited

U.S. PATENT DOCUMENTS

| 5,621,942 | A | | 4/1997 | Eustache et al. |
| 5,683,215 | A | | 11/1997 | Gaignard et al. |
| 5,836,042 | A | * | 11/1998 | Funk et al. ................. 15/250.3 |
| 6,216,309 | B1 | * | 4/2001 | Goto et al. ............... 15/250.31 |
| 6,422,102 | B1 | * | 7/2002 | Kuehbauch .................... 74/96 |
| 2005/1003929 | | * | 2/2005 | Morin et al. ............... 15/250.3 |

FOREIGN PATENT DOCUMENTS

| DE | 403 63 67 A | 5/1992 |
| DE | 196 42 666 A1 | 10/1997 |
| DE | 197 12 113 A1 | 9/1998 |
| DE | 199 63 918 A | 7/2001 |
| JP | 60042121 A | 3/1985 |

* cited by examiner

*Primary Examiner*—Gary K Graham
(74) *Attorney, Agent, or Firm*—Michael Best & Friedrich LLP

(57) ABSTRACT

The invention relates to a wiper system with a wiper drive (1), which is comprised of a wiper motor (2) and a gear (3). A wiper arm shaft (14) for a wiper arm (19) can be driven via the output shaft (5) of the gear (3). Linking points (31, 32, 33) for accommodating the wiper drive (1) on a surface (24, 40) are arranged in the housing area (7) of the wiper drive (1). The linking points (31, 32, 33) of the wiper drive (1) each feature a decoupling element (41, 42, 43), in which fastening elements (55) to mount the wiper drive (1) either on a vehicle body (24) or on a screw-down surface (40) are accommodated.

3 Claims, 4 Drawing Sheets

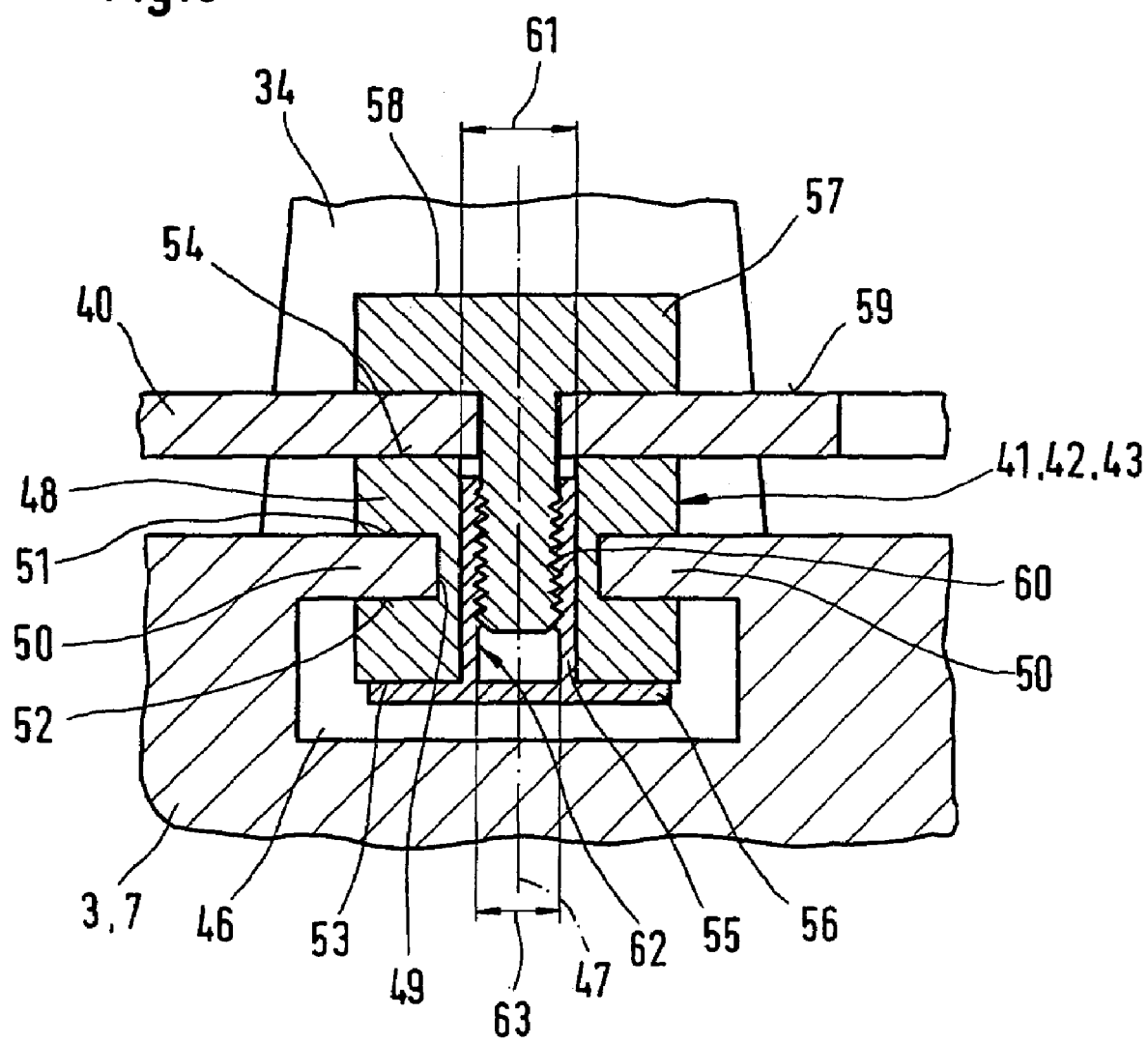

BEARING FOR WIPER DRIVES

FIELD OF TECHNOLOGY

Figure 1:
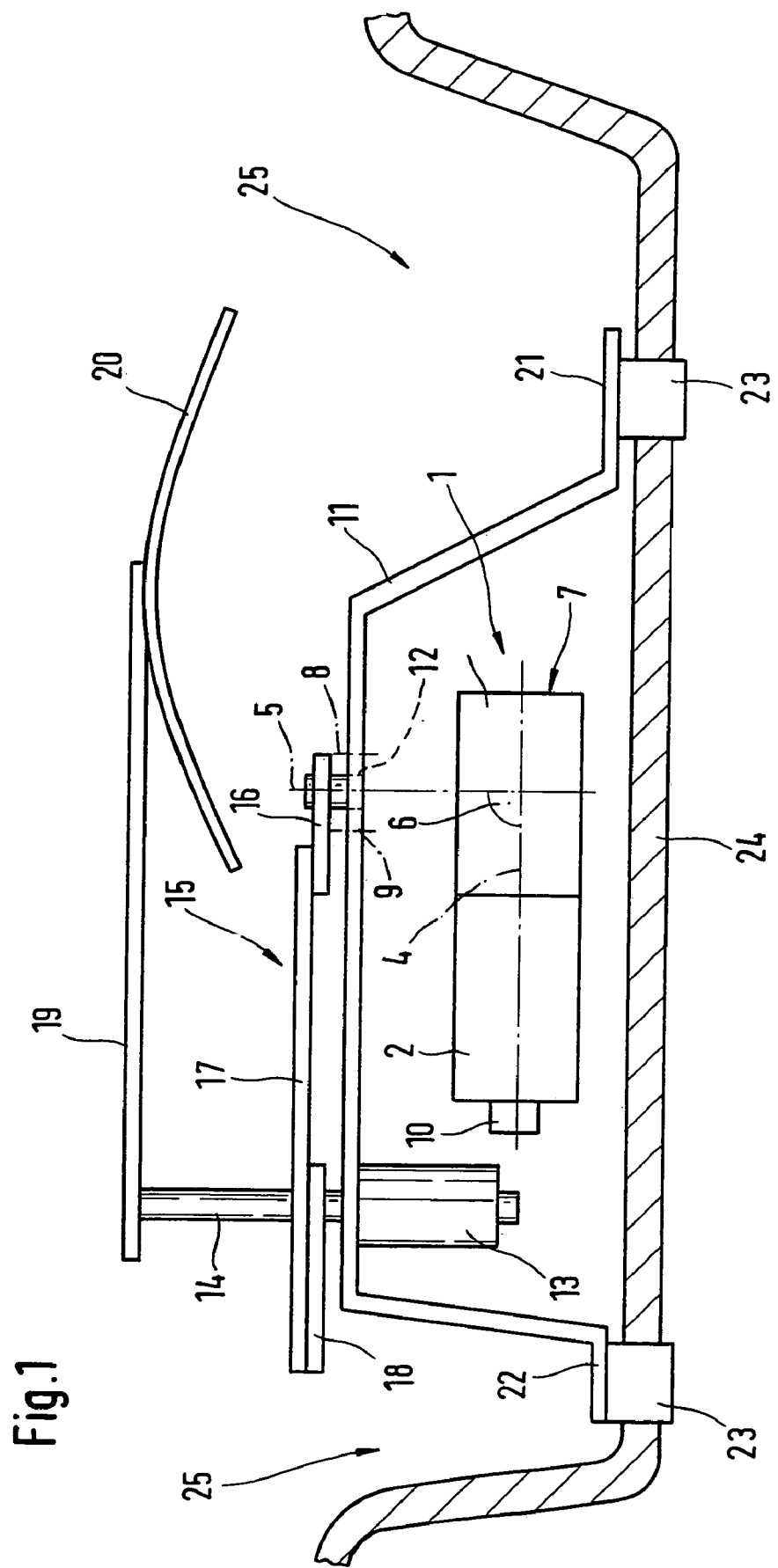

The invention relates to a support for wiper drives of windshield wiper systems, in particular to clean front and rear windows of vehicles. The windshield wiper systems comprise electric motors, which drive a uniform-transmission gear, to which a uniform-transmission gear such as a crank-and-rocker linkage or the like can be subordinated as a coupling element to a wiper arm or a wiper lever. The electric motor and the uniform-transmission gear are connected to the body of a vehicle by means of a diecast part or bent sheet metal part.

STATE OF THE ART

The subject of DE 196 42 666 A1 is a support for drive shafts of a windshield wiper system. A wiper system includes a tubular mounting plate, which features at least one tubular element to support drive shafts. A bearing bush is built into this tubular element. The bearing bush is fixed in positive engagement vis-à-vis the tubular element. The bearing bush has at least one collar. The tubular element includes an inner contour deviating from a circular shape that is polygon-shaped or noncircular in particular, while the bearing bush features an outer contour matching this inner contour. The contour between the bearing bush and the tubular element can also be embodied running conically in the axial direction.

DE 197 12 113 A1 deals with the support of a wiper drive. A wiper system for a vehicle includes a wiper motor and a gear, which is fastened with fastening areas formed on its housing to a tubular support via a receptacle. The receptacle encircles the tubular support in positive engagement and/or adherently. The tubular support features a noncircular shape in the circumferential direction and/or a changing contour, dimension or alignment in the longitudinal direction. The receptacle represents a very complex component and is completely or partially formed on the gear housing.

DESCRIPTION OF THE INVENTION

A linking of a wiper drive to a vehicle body that can be executed in a standardized manner can be achieved with the attainment proposed in accordance with the invention. To do this, linking points are provided in the wiper drive, which are comprised of a drive motor and a gear, either in the housing of the drive motor or on the gear housing, and these linking points are not directly connected to the drive motor or the gear, but are arranged on the drive motor or the gear via decoupling elements.

The linking points provided with decoupling elements can also be connected directly both to the vehicle body beneath the windshield or to the vehicle body beneath a rigid, upright rear window. In addition, the wiper drive, comprised of the drive motor and the gear, can be accommodated on a holding plate via the wiper drive's linking points that are provided with decoupling elements.

When directly linking the wiper drive to the body of a vehicle, a screw-down surface with a hole pattern suitable for accommodating the wiper drive can already be provided there. As a result, a separate fastening element can be dispensed with. When fastening the wiper drive to a holding plate, which is connected to the body of a vehicle, the holding plate serves as a holder for the wiper drive. The holding plate can be adapted in an advantageous manner to the geometry of the installation space required to accommodate the wiper drive and features a hole pattern suitable for accommodating the wiper drive. No separately supplied decoupling elements are required on the holding plate for the wiper drive. Decoupling the wiper drive from the vehicle body with respect to the transmission of noises and vibrations originating from the wiper motor or from the gear, is accomplished via the linking points provided with decoupling elements that are executed on the linking points to the body or the holding plate on the wiper drive—whether on the housing of the drive motor or on the housing of the gear.

The attainment proposed in accordance with the invention makes it possible to standardize the linking of a wiper drive to a vehicle body. In addition, the type variety of the to-be-supplied decoupling elements can be considerably reduced with the attainment proposed in accordance with the invention. It is simpler and more cost effective to make use of decoupling elements that have already been used and proven. A reduction in the parts of a wiper system can be achieved by eliminating a motor holder in accordance with the first of the above mentioned installation variations. In addition, the joining process of the wiper drive is simplified considerably in the case of wall mounting at the vehicle manufacturer. The worker can grasp the wiper motor with one hand, while with his other hand he screws the wiper drive on the screw-down surface or on the holding plate from above using a suitable standard tool. In addition, with respect to assembly of the wiper drives embodied in accordance with the invention, the decoupling elements and the fastening elements, such as threaded bushings, can already be connected during assembly to the wiper housing or the gear housing of the wiper drive. This allows the variety of to-be-supplied individual parts that are required during assembly of the wiper drive to be reduced considerably.

Another embodiment of the wiper drive proposed in accordance with the invention consists of connecting the wiper drive motor with the vehicle body via two decoupling elements, which are fastened on the gear housing of the gear allocated to the wiper drive motor and on the pole pot end of the wiper drive motor. The decoupling element provided on the pole pot end of the wiper drive motor can optionally be integrated directly into the vehicle body or be arranged on a motor holder. This embodiment of the wiper drive proposed in accordance with the invention offers the advantage that the connection of the wiper drive, comprised of a wiper drive motor and a gear, can be fastened on its receptacles on the vehicle body as far as possible away from the output shaft of the gear so that the wiper drive can absorb greater forces or torques occurring when wiping the front or rear window. The wiper drive proposed in accordance with the invention is suited for realizing a wiper direct drive, in which a nonuniform-transmission gear is eliminated and the structure of the wiper system features a drive motor, a uniform-transmission gear that is allocated to it (components of the wiper drive) and a wiper arm, dispensing with a wiper linkage. The shaft accommodating the wiper arm can be driven directly with the output shaft of the uniform-transmission gear. In addition, reversing electronics to reverse the wiper drive motor when it reaches its end positions as well as position sensor technology can be allocated to the wiper drive motor of the wiper drive.

DRAWINGS

The invention will be explained in greater detail on the basis of the drawings.

They show:

FIG. 1 A wiper system with a wiper drive accommodated on an individually configured holder with a wiper lever linkage.

Figure 2A:
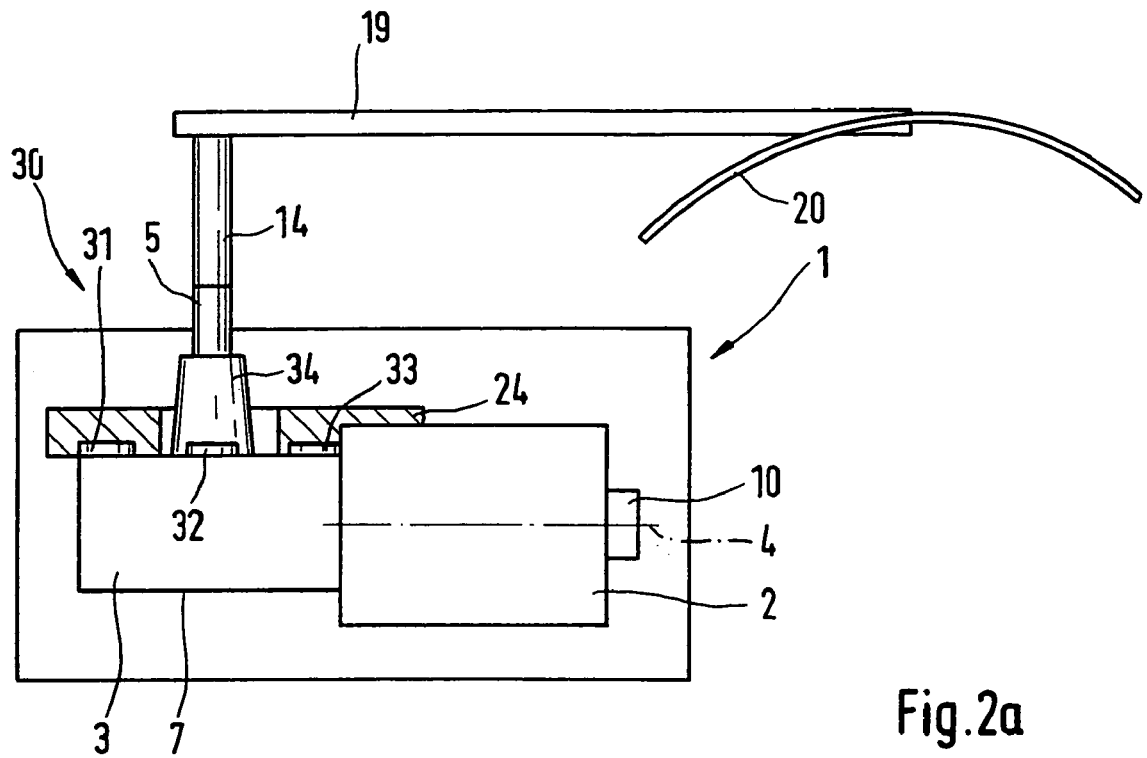

FIG. 2a A view of a wiper direct drive in accordance with an embodiment of the present invention.

Figure 2B:
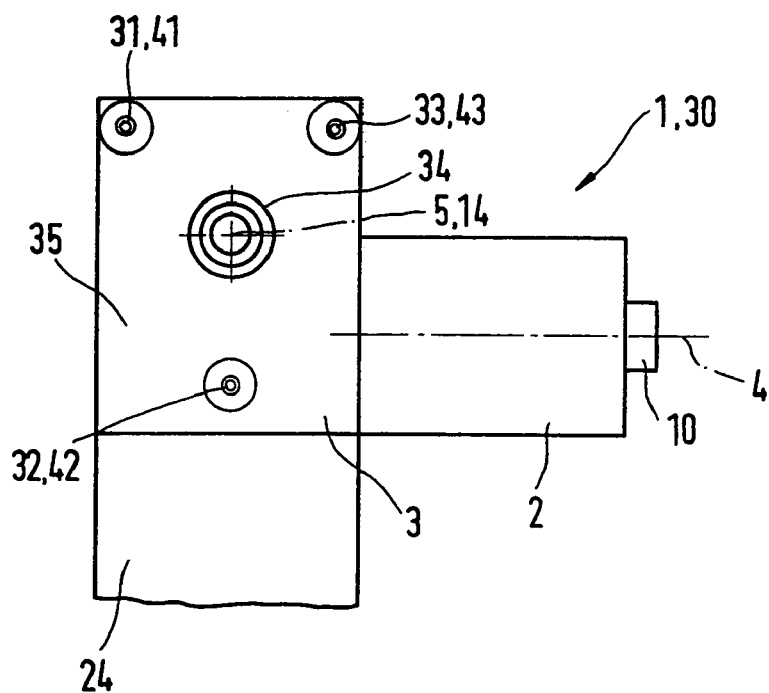

FIG. 2b A top view of the embodiment of the wiper direct drive in accordance with FIG. 2a.

Figure 3:
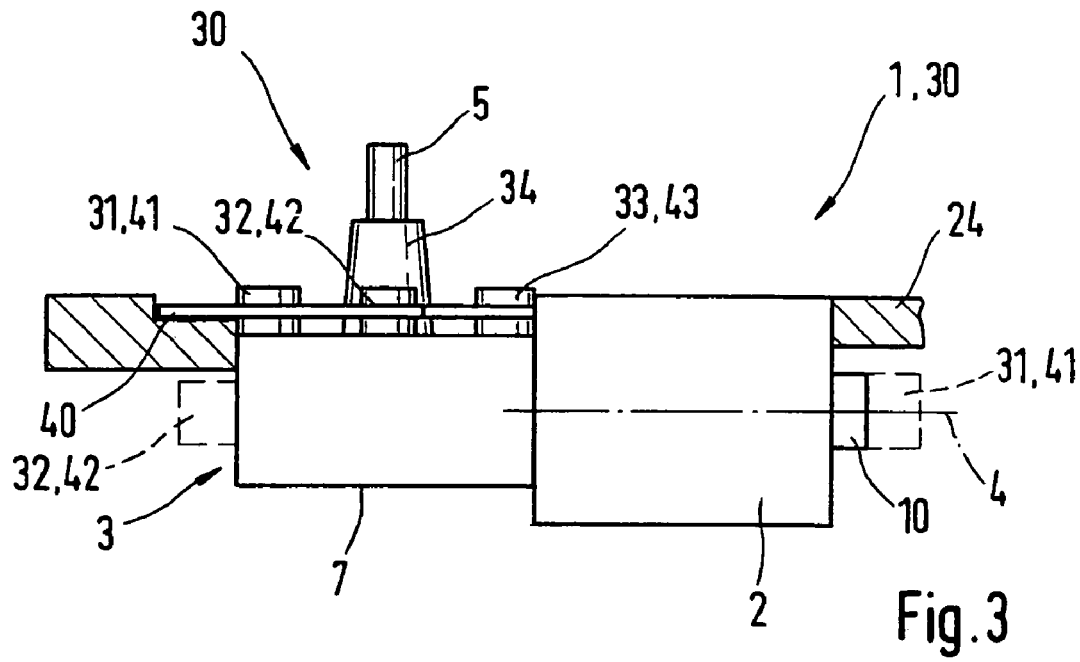

FIG. 3 A wiper drive fastened on a holding plate provided on the body side in accordance with another embodiment of the attainment proposed in accordance with the invention.

Figure 4:
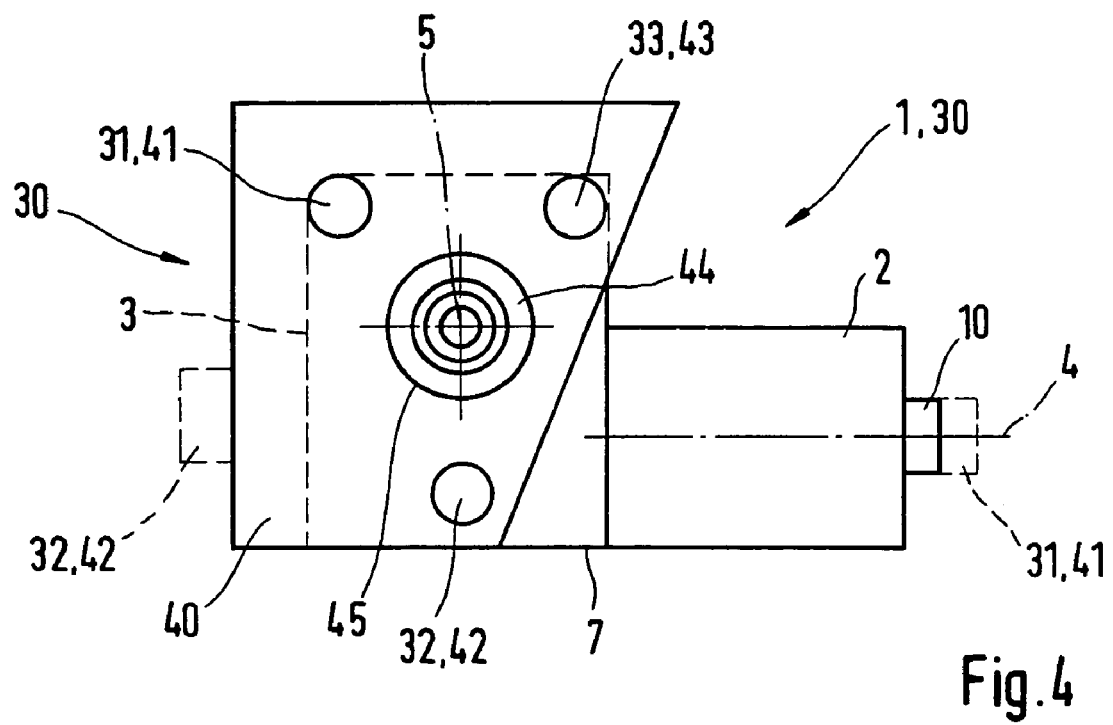

FIG. 4 A top view of wiper direct drive in FIG. 3 accommodated on a holding plate of a vehicle body.

FIG. 5 A linking point of a wiper drive, which is embodied as a wiper direct drive, on a holding plate that is provided on the body side.

EMBODIMENTS

The depiction in accordance with FIG. 1 shows a wiper system whose wiper drive is accommodated on an individual motor holder, whereby the wiper system is comprised of a wiper linkage consisting of a coupling element drive crank and coupling element output crank.

A wiper drive 1 includes a wiper motor 2, to which a uniform-transmission gear 3 is allocated: An output shaft of the wiper motor 2 is located at a right angle 6 to an output shaft 5 of the gear 3. A gear housing 7 of the uniform-transmission gear 3 is connected at a first connecting point 8 as well as at a second connecting point 9 to a holder 11, which is embodied as a bent sheet metal part for example.

The wiper motor 2 of the wiper drive 1 includes a pole pot 10 on its end opposite from the output shaft 5; the output shaft 5 of the uniform-transmission gear 3 of the wiper drive 1 penetrates an opening 12 of the holder 11 between the first connecting point 8 and the second connecting point 9. In the embodiment of a wiper system depicted in FIG. 1, a drive crank 16 is embodied on the end of the output shaft 5 of the uniform-transmission gear 3, which end projects through the opening 12 of the holder 11. The drive crank 16 is connected in an articulated manner to a coupling element 17, which is embodied as a coupling rod. The end of the coupling rod 17 facing away from the drive crank 16 is connected in turn to an output crank 18, which is connected with a wiper drive shaft 14 in a torque-proof manner. The wiper drive shaft 14 is accommodated in a support 13, which for its part is also flange-mounted to the holder 11 that is embodied as a bent sheet metal part.

In the depiction of a wiper system reproduced in FIG. 1, the rotational movement of the output shaft 5 of the uniform-transmission gear 3 is transmitted via a wiper linkage 5 to the wiper drive shaft 15. The wiper drive shaft 14 is connected in a torque-proof manner with wiper arm 19, on which a wiper blade 20 is accommodated. The window to be cleaned by the wiper blade 20, whether it is a front windshield or a rear windshield of a vehicle, is not shown in the depiction according to FIG. 1.

The holder 11 includes a first right angle bend 21 as well as another, second right angle bend 22. In the area of the first right angle bend 21 as well as the second right angle bend 22 of the holder 11 that is embodied as a bent sheet metal part, this holder accommodating a support 13 for the wiper drive shaft 14 and accommodating a wiper drive 1 is connected to the vehicle body 24 via receptacle elements 23. A recess 25 is depicted in the vehicle body 24, in which the wiper drive 1 for a wiper system is accommodated beneath the windshield by means of a plastic covering or by means of the closed engine hood.

The wiper linkage designated by reference number 15 represents a nonuniform-transmission gear and is used to realize a wiper movement on the window for the nonuniform transmission of the rotational movement produced by uniform-transmission gear 3. The distance between the output shaft 5 of the wiper drive 1 and the wiper arm drive shaft 14 should remain constant over the entire wiper angle course since otherwise the required wiper angle precision related to the target course (target trajectory) cannot be complied with. A rigid connection between the wiper arm drive 1 and the wiper arm drive shaft 14 is guaranteed by the holder element 11 used that is embodied as a bent sheet metal part. FIG. 2a shows a first embodiment of a wiper direct drive proposed in accordance with the invention having a direct linking possibility to a vehicle body.

In contrast to the embodiment of a wiper drive depicted in FIG. 1, the wiper direct drive 30 in the representation in FIG. 2a does not include a nonuniform-transmission wiper linkage 15. On the contrary, the output shaft 5 of the gear 3 of the wiper drive 1 surrounded by a drive shaft dome 34 acts directly on the wiper drive shaft 14, on which in turn the wiper arm 19 accommodating the wiper blade 20 is accommodated. The output shaft 5 of the gear 3 and the wiper drive shaft 14 can also be embodied as one component. In the embodiment of the attainment proposed in accordance with the invention depicted in FIG. 2a, the uniform-transmission gear 3 is laterally flange-mounted on the wiper motor 2. Reference number 7 identifies the gear housing and reference number 4 identifies the output shaft of the wiper motor 2. Located on the upper side of the gear housing 7 of the uniform-transmission gear 3 is the output shaft dome 34, which surrounds the output shaft 5 of the uniform-transmission gear 3. A first linking point 31, a second linking point 32 and finally another, third linking point 33 are allocated to the upper side of the gear housing 7 of the uniform-transmission gear 3. These linking points can be used to accommodate the wiper direct drive depicted in FIG. 2a directly on a vehicle body 24 without requiring an additional holder (see holder 11 in accordance with FIG. 1). The first linking point 31, the second linking point 32 as well as the third linking point 33 can be provided with decoupling elements, which prevent a transmission of noises or vibrations from the wiper drive 1 to the vehicle body 24. The decoupling elements can be seen in the depiction in FIG. 5 and the position and arrangement of the decoupling elements can be seen in the depiction in FIG. 3.

FIG. 2b shows a top view of the embodiment of a wiper direct drive depicted in FIG. 2a.

The top view in FIG. 2b shows that the uniform-transmission gear 3 includes a mounting surface 35 on which a first linking point 31, the second linking point 32 and the third linking point 33 are embodied. Recognizable in the center of the mounting surface 35, which represents the upper side of the gear box 5 of the uniform-transmission gear 3, is the output shaft dome 34, which surrounds the output shaft of the uniform-transmission gear 3, which shaft aligns with a wiper drive shaft 14 that is accommodated coaxially to it (see depiction in FIG. 2a). The wiper drive 1 of the wiper direct drive 30 depicted in the top view in FIG. 2b can be directly integrated into a vehicle body if appropriate openings are embodied in the vehicle body 24 corresponding to the position of the first linking point 31, the second linking point 32 and the third linking point 33 into which the wiper drive 1 can simply be slid in accordance with the depiction in FIG. 2b. The output shaft dome 34 penetrates the vehicle body 24 and screwing down or fastening the wiper drive 1 to the vehicle body 24 can be accomplished by means of a standard tool.

FIG. 3 shows a depiction of another embodiment of a wiper drive, which also represents a wiper direct drive.

In contrast to the embodiments depicted in FIG. 2a and FIG. 2b, the wiper direct drive 30 in FIG. 3 is indirectly connected to a vehicle body 24 (not shown in FIG. 3) via a holding plate 40. Similar to the embodiment of a wiper direct drive 30 shown in FIG. 2a or 2b, a first decoupling element 41, another, second decoupling element 42 as well as a third decoupling element 43 are located on the upper side of gear housing 7 of the uniform-transmission gear 3 at the first linking point 31, the second linking point 32 as well as at the third linking point 33. Linking the wiper drive 1 comprised of a wiper motor 2 and a uniform-transmission gear 3 to a holding plate 40 is accomplished by means of the decoupling elements 41, 42 and 43. The holding plate 40 is already accommodated on the vehicle body 24 and provided with an appropriate hole pattern corresponding to the position of the linking points 31, 32, 33 on the mounting surface 35 of the wiper drive 1 so that the wiper drive 1 of the wiper direct drive 30 can be fastened to this. The holding plate 40 can be adapted in an advantageous manner to the geometry of the vehicle body 24 or to the installation space 25 required to accommodate the wiper drive 1.

No decoupling elements to be supplied separately for dampening noises and vibrations are required on the vehicle body or on the holding plate 40, on which the wiper drive 1 of a wiper direct drive 30 is accommodated. The decoupling elements (see depiction in FIG. 5) are all already integrated in the housing components such as the gear housing 7 during assembly of the wiper drive 1, which is comprised of a wiper motor 2 and a uniform-transmission gear 3.

FIG. 4 shows a top view of the embodiment of a wiper direct drive depicted FIG. 3.

The geometry of the holding plate 40 can be seen in the depiction in FIG. 4. In the top view in FIG. 4, the holding plate 40 is located above the gear housing 7 of the uniform-transmission gear 3, which is laterally flange-mounted on the wiper motor 2 of the wiper drive 1. The output shaft 4 of the wiper motor 2 acts on the uniform-transmission gear's 3 output shaft 5 which extends perpendicular to the plane of projection in the top view in FIG. 4. The output shaft 5 of the uniform-transmission gear 3 is surrounded by the output shaft dome 34, which also extends perpendicular to the plane of projection in FIG. 4. The output shaft dome 34 embodied on the upper side of the gear housing 7 penetrates the holding plate 40, and an opening 45, which is provided in the holding plate 40. Embodied between the outer circumferential surface of the output shaft dome 34 and the edge of the opening 45 is a ring area 44 so that no contact occurs between the holding plate 40 and the output shaft-dome 34 surrounding the output shaft 5. The holding plate 40, which is connected with a vehicle body, is connected with the wiper drive 1 of the wiper direct drive 30 at a first linking point 31, at a second linking point 32 as well as at a third linking point 33, each of which include a decoupling element 41, 42 or 43 (see depiction of the decoupling elements 41, 42, 43, in FIG. 5).

In an embodiment of the attainment proposed in accordance with the invention, a first linking point 31 on which a first decoupling element 41 is arranged can be provided laterally on the housing of the wiper motor 2 in the area of the pole pot end 10. A second linking point 32 with a further, second decoupling element 42 can be provided opposite from this on a lateral surface of the gear housing 7 of the uniform-transmission gear. The decoupling element 41 allocated to the pole pot end 10 is either directly mounted in the vehicle body or mounted on a motor holder (not shown here). This embodiment achieves in an advantageous manner that the connection of the wiper motor 2 to its fastening elements, i.e., to the first linking point 31 and the second linking point 32 (both indicated by dashed lines), is arranged as far as possible away from the output shaft 5 of the uniform-transmission gear 3 so that higher forces or higher torques can be absorbed or transmitted via the wiper drive 1 in accordance with the depiction in FIG. 4.

The depiction in FIG. 5 shows, in an enlarged scale, a decoupling element to decouple a wiper drive 1 from a vehicle body or a holding plate connected with it. The depiction in FIG. 5 shows a section of a housing 7 of a uniform-transmission gear 3, whereby a recess 46 is arranged in it. A part of the holding plate 40, which can be connected to a part of a vehicle body not shown in FIG. 5, is shown above the housing 7 of the uniform-transmission gear 3. A first decoupling element 41, a second decoupling element 42 as well as a third decoupling element 43 can be embodied as bushings 48 in accordance with the depiction in FIG. 5. A revolving annual groove 49 is embodied on the outer circumferential surface of the bushings 48. A ring surface 50, which delimits the recess 46 within the gear housing 7 of the wiper drive 1, engages in this revolving annular groove 49 of the bushing 48. The bushing 48 includes a first fore part 53 projecting into the recess 46 and a second fore part 54 assigned to the holding plate 40 for connecting with the vehicle body 24. The bushings 48 that can be used as decoupling elements 41, 42, 43, which can be constituted of a plastic material or a vibration-absorbing elastomer, are provided with a first fastening element 55 in the form of a threaded bushing. The threaded bushing 55 includes a bushing head 56, which, in the state shown in FIG. 5, is adjacent to first fore part 53 of the bushing 48 within the recess 46. In addition, the threaded bushing 55 features a sleeve-like projection, which is surrounded by a bore hole wall (embodied in the diameter 61) of the bushing 48 used as decoupling elements 41, 42, 43. The sleeve-like projection on the threaded bushing 55, which is provided with an internal screw thread, is embodied in an inside diameter 63.

The threaded bushing 55 is slid into the bore hole of the bushing 48 before mounting the decoupling elements 41, 42, 43 that can be embodied as bushings 48 in the gear housing 7. Then the bushing 48 is mounted on the ring surface 50 of the gear housing 7. Finally, the gear housing 7 of the wiper drive 1, which in the illustration in FIG. 5 accommodates the decoupling elements 41, 42, 43, is positioned beneath the holding plate 40. By inserting a fastening element 57, which can be embodied as a screw, a connection can be produced between the fastening element 57 and the threaded bushing 55 surrounded by the bushing 48 using a standard tool. After tightening the screwed connection 60, the head 58 of the fastening element 57 lies on an upper side 59 of the holding plate 40. As a result of the screwed connection 60, the threaded bushing 55 and the fastening element 57 are braced adherently against one another, whereby the gear housing 7 of the wiper drive 1 is fastened on the holding plate 40, which for its part is accommodated on a body part of a vehicle body (not depicted in FIG. 4).

The recesses 46 for accommodating the decoupling elements 41, 42, 43 on a gear housing 7 are depicted embodied in FIG. 5. However, the decoupling elements 41, 42, 43 could, of course, also be set into the housing of the wiper motor without coming into direct contract with the wiper motor. By connecting the wiper drive 1, which is embodied as a wiper direct drive 30, either directly on the vehicle body 24 or on a holding plate 40 depicted in the figure, a linking of the wiper drive 1 to the vehicle body or on the holding plate 40 is accomplished in such a way that the noises or vibrations originating from the wiper drive 1 cannot be transmitted to the vehicle body (see depiction in FIG. 1). If the bushings 48 used as decoupling elements 41, 42, 43 are manufactured of a plastic material or an elastomer, an exactly tolerated ring arrangement 62 between the threaded bushing 55 and the bore hole of the bushing 48 accommodating this can be achieved. Depending upon the tightening torque that is applied to the fastening element 57, an adherent connection is produced between the fastening element 57 and the threaded bushing 55, which pretensions the bushing 48, which is preferably manufactured of an elastomer material and represents the decoupling element 41 or 42 or 43, in the axial direction so that stable linking of the wiper drive 1 to the vehicle body 24 can be achieved.

The embodiment of a wiper drive 1 proposed in accordance with the invention allows a wiper direct drive 30 to be realized in which the wiper drive shaft 14 is connected directly to the output shaft of the uniform-transmission gear 3 of the wiper drive 1. A nonuniform-transmission gear 3 (wiper linkage 15 in accordance with the depiction in FIG. 1) can thus be eliminated. The connection between the wiper drive 1, a wiper motor 2 and a uniform-transmission gear 3 that is integrated into this or a uniform-transmission gear 3 that is flange-mounted on this, can be accomplished, according to the depictions in FIGS. 2a and 2b, directly on the vehicle body 24 beneath a windshield, on the one hand. On the other hand, this drive 1 can be mounted according to the proposed attainment on a holding plate 40 adapted to the installation space conditions. The decoupling elements 41, 42, 43 are already integrated into the wiper drive 1 in an advantageous manner so that no additional decoupling elements must be supplied on the vehicle manufacturer side, but only screw-down surfaces must be provided on the vehicle body 24 or on the holding plate 40 with an appropriate hole pattern for accommodating the linking points 31, 32, 33. On the side of the wiper drive 1, containing the wiper motor 2 and a uniform-transmission gear 3, the decoupling elements 41, 42, 43, which can be embodied as a bushing 48 manufactured of an elastomer material, can be integrated both into the housing of the wiper motor 2 as well as into the housing of the uniform-transmission gear 3 that is allocated to it.

In the case of the attainment proposed in accordance with the invention, a standardized linking of the wiper drive 1 to a vehicle body 24 can be realized either directly on the vehicle body or indirectly via a holding plate 40 on the body. A reduction in the type variety can be achieved by using the same decoupling elements 41, 42, 43. In particular, due to the elimination of an individually configurable motor holder 11 (see illustration in FIG. 1), it is possible to achieve a reduction in parts for a windshield wiper system whether this is for use in the front or rear windshields of vehicles. Considerably easier assembly of the wiper drive proposed in accordance with the invention can be achieved in vehicle final assembly due to the uniformly configured hole pattern with respect to the linking points 31, 32 and 33, at which one decoupling element 41, 42, or 43 each is provided. The worker holds the wiper drive 1 in its joining position in one hand, while, with his other hand, he screws down the fastening elements 57 with the threaded bushings 54 that are already pre-mounted in the decoupling elements 41, 42, 43 using a standard tool (screwdriver).

With regard to manufacturing the wiper drives 1 proposed in accordance with the invention, the decoupling elements 41, 42, 43 and the fastening elements 55 surrounded by these can already be permanently connected to the housing of the uniform-transmission gear 3 or of the wiper motor 2 during assembly so that a reduction of the to-be-supplied individual parts can be achieved in the delivery or assembly of a so constituted wiper drive, which can also be used as wiper direct drive 30.

LIST OF REFERENCE NUMBERS 1 wiper drive
2 wiper motor
3 uniform-transmission gear
4 output axis, wiper motor
5 output shaft, gear 3
6 angle
7 gear housing
8 first connecting point
9 second connecting point
10 pole pot end
11 holder
12 opening for output shaft, gear 3
13 support for wiper drive shaft
14 wiper drive shaft
15 wiper linkage
16 drive crank
17 coupling rod
18 output crank
19 wiper arm
20 wiper blade
21 first right angle bend, holder 11
22 second right angle bend, holder 11
23 receptacle element
24 vehicle body
25 recess for wiper drive
30 wiper direct drive
31 first linking point
32 second linking point
33 third linking point
34 output shaft dome
35 mounting surface
40 holding plate
41 first decoupling element
42 second decoupling element
43 third decoupling element
44 ring area
45 opening, output shaft
46 recess, gear housing 7
47 axis of symmetry
48 bushing
49 annular groove
50 ring surface
51 first bearing surface
52 second bearing surface
53 first fore part
54 second fore part
55 threaded bushing
56 threaded bushing head
57 fastening element (screw)
58 screw head
59 upper side, ring surface 50
60 screwed connection
61 diameter bore hole of bushing 48
62 ring arrangement
63 inside diameter threaded bushing

The invention claimed is:

1. Wiper system with a wiper drive, which is comprised of a wiper motor having an output shaft on one end and having an opposite end, the wiper drive also comprised of a gear, via whose output shaft a wiper arm drive shaft of a wiper arm can be driven and linking points for accommodation on a surface are arranged on housing areas of the wiper drive, wherein the linking points of the wiper drive each feature a decoupling element, on which fastening elements to mount the wiper drive either on a vehicle body or on a screw-down surface are accommodated, characterized in that a first linking point is located on the opposite end of the wiper motor and another linking point is located on a gear housing of the gear, via which the wiper drive can be directly or indirectly accommodated in decoupling elements on the vehicle body, in which the wiper drive is embodied as wiper direct drive, in which the output shaft of the gear is connected directly with the wiper arm drive shaft, and characterized in that the decoupling element is set into a ring surface, which delimits a recess in the housing area of the wiper motor or of the gear, in that the decoupling element is embodied as a rotationally symmetrical bushing and features an annular recess on its circumferential surface, and in that a radial wall of the recess is spaced from the circumferential surface of the bushing.

2. Wiper system with a wiper drive, which is comprised of a wiper motor having an output shaft on one end and having an opposite end, the wiper drive also comprised of a gear, via whose output shaft a wiper arm drive shaft of a wiper arm can be driven and linking points for accommodation on a surface are arranged on housing areas of the wiper drive, wherein the linking points of the wiper drive each feature a decoupling element, on which fastening elements to mount the wiper drive either on a vehicle body or on a screw-down surface are accommodated, characterized in that a first linking point is located on the opposite end of the wiper motor and another linking point is located on a gear housing of the gear, via which the wiper drive can be directly or indirectly accommodated in decoupling elements on the vehicle body, in which the wiper drive is embodied as wiper direct drive, in which the output shaft of the gear is connected directly with the wiper arm drive shaft, and characterized in that the decoupling element is set into a ring surface, which delimits a recess in the housing area of the wiper motor or of the gear, in that the decoupling element features a receptacle opening for a fastening element, and in that the fastening element includes a first fastening element having a head engaging an axial surface of a portion of the decoupling element in a recess and a sleeve-like threaded portion positioned in the receptacle opening of the decoupling element and a second fastening element having a head positioned outside of the recess and a screw portion received in the threaded portion of the first fastening element.

3. Wiper system according to claim 2, characterized in that the recess has an axial end wall and a radial wall extending between the ring surface and the end wall, in that the end wall is spaced from an axial surface of the head of the first fastening element, and in that the radial wall is spaced from a circumferential wall of the decoupling element.

* * * * *

UNITED STATES PATENT AND TRADEMARK OFFICE
CERTIFICATE OF CORRECTION

| | | |
|---|---|---|
| PATENT NO. | : 7,640,619 B2 | Page 1 of 1 |
| APPLICATION NO. | : 10/481904 | |
| DATED | : January 5, 2010 | |
| INVENTOR(S) | : Moosmann et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1073 days.

Signed and Sealed this

Sixteenth Day of November, 2010

David J. Kappos
*Director of the United States Patent and Trademark Office*